(12) United States Patent
Zhandry (10) Patent No.: US 12,489,636 B2
(45) Date of Patent: Dec. 2, 2025

(54) POST-QUANTUM COLLISION RESISTANT HASH FUNCTION

(71) Applicant: NTT Research, Inc., Sunnyvale, CA (US)

(72) Inventor: Mark Zhandry, Princeton, NJ (US)

(73) Assignee: NTT Research, Inc., Sunnyvale, CA (US)

( * ) Notice: Subject to any disclaimer, the term of this patent is extended or adjusted under 35 U.S.C. 154(b) by 382 days.

(21) Appl. No.: 18/193,556

(22) Filed: Mar. 30, 2023

(65) Prior Publication Data

US 2023/0318840 A1  Oct. 5, 2023

Related U.S. Application Data

(60) Provisional application No. 63/325,592, filed on Mar. 30, 2022.

(51) Int. Cl.
*H04L 9/00* (2022.01)
*H04L 9/32* (2006.01)

(52) U.S. Cl.
CPC ................................. *H04L 9/3236* (2013.01)

(58) Field of Classification Search
CPC .... H04L 9/3236; H04L 9/0643; H04L 9/3093
See application file for complete search history.

(56) References Cited

U.S. PATENT DOCUMENTS

2020/0410488 A1* 12/2020 Srinivasan ....... G06Q 20/38215

OTHER PUBLICATIONS

"Hamlin, Quantum security of hash functions and property-preservation of iterated hashing, 2019, Post-quantum Cryptography: 10th International Conference PQCrypto 2019, pp. 329-349" (Year: 2019).*

"Unruh, Collapsing sponges: Post-quantum security of the sponge construction, 2017, Cryptology ePrint Archive, pp. 1-24" (Year: 2017).*

* cited by examiner

*Primary Examiner* — Kevin Ayala
(74) *Attorney, Agent, or Firm* — CipherLaw (57) ABSTRACT

Systems, methods, and computer-readable media for creating a quantum-secure hash of an m-bit input are disclosed. The disclosure relates to the first statistically hiding post-quantum commitments and post-quantum succinct arguments (of knowledge) under the same assumptions. Results are obtained by a general theorem which shows how to construct a collapsing hash H' from a post-quantum collision-resistant hash function H, regardless of whether or not H itself is collapsing, assuming H satisfies a certain regularity condition we call "semi-regularity".

20 Claims, 3 Drawing Sheets

POST-QUANTUM COLLISION RESISTANT HASH FUNCTION

CROSS-REFERENCE TO RELATED APPLICATIONS

This application claims the benefit of U.S. Provisional Application No. 63/325,592, filed Mar. 30, 2022, the entire contents of which are incorporated herein by reference.

FIELD OF THE INVENTION

The disclosure relates to a post-quantum collision resistant hash function.

BACKGROUND OF THE INVENTION

Collapsing is a post-quantum strengthening of collision resistance, needed to lift many classical results to the quantum setting. Unfortunately, the only existing standard-model proofs of collapsing hashes require Learning With Errors (LWE).

BRIEF SUMMARY OF THE INVENTION

The disclosure relates to the first statistically hiding post-quantum commitments and post-quantum succinct arguments (of knowledge) under the same assumptions. Our results are obtained by a general theorem which shows how to construct a collapsing hash H' from a post-quantum collision-resistant hash function H, regardless of whether or not H itself is collapsing, assuming H satisfies a certain regularity condition we call "semi-regularity".

We construct the first collapsing hashes from the quantum hardness of any one of the following problems:
  LPN in a variety of low noise or high-hardness regimes, essentially matching what is known for collision resistance from LPN.
  Finding cycles on exponentially-large expander graphs, such as those arising from isogenies on elliptic curves.
  The "optimal" hardness of finding collisions in any hash function.
  The polynomial hardness of finding collisions, assuming a certain plausible regularity condition on the hash.

As an immediate corollary, we obtain the first statistically hiding post-quantum commitments and post-quantum succinct arguments (of knowledge) under the same assumptions. Our results are obtained by a general theorem which shows how to construct a collapsing hash H' from a post-quantum collision-resistant hash function H, regardless of whether or not H itself is collapsing, assuming H satisfies a certain regularity condition we call "semi-regularity".

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

1 Introduction

Collision resistance is one of the most important cryptographic concepts, with numerous applications throughout cryptography. A collision resistant hash function $H:\{0,1\}^m \to \{0,1\}^n$ is one where n<m, thus guaranteeing that collisions exist in abundance, but where actually finding such collisions is computationally intractable. Collision resistance provably follows from most number-theoretic problems used in cryptography, and is one of the main design goals in constructions built from symmetric key tools, such as SHA2 or SHA3.

What happens when quantum computers enter the picture? For any application that required collision resistance classically, certainly a minimal condition is that it remains intractable for quantum algorithms to find a collision. We will call this notion a "postquantum" collision resistant hash function (PQ-CRHF). Post-quantum security rules out constructions based on discrete logarithms or factoring due to Shor's algorithm. Surprisingly, however, even PQ-CRHFs are often insufficient for applications, as first demonstrated by Ambainis, Rosmanis, and Unruh with a counterexample. The issue usually stems from rewinding, which is known to be problematic quantumly. Examples include commitments and more generally interactive protocols.

To remedy the situation, Unruh proposes a strengthening of collision resistance called collapsing. Very roughly, collapsing means that measuring the hash of a quantum superposition of messages is quantum computationally indistinguishable from measuring the message superposition itself, even though both operations are information-theoretically very different. Since its introduction, collapsing hashes have become recognized as the preferred notion of post-quantum security, being the appropriate post-quantum replacement for classical collision resistance whenever there is rewinding, and sometimes even when rewinding is not present. Unsurprisingly, collapsing is also a natural property beyond hash functions, being the right notion of post-quantum commitments (whereas PQ computational binding is useless), identification protocols underlying post-quantum signatures, and general argument systems.

Given their importance to post-quantum security, it is crucial to understand how to construct collapsing hash functions. Unfortunately, there are essentially only two classes of constructions. The first are idealized model proofs, where one proves collapsing relative to, say, a random oracle. The second are standard-model proofs, where the only existing paradigm leverages lossy functions or closely related concepts, whose only known postquantum instantiations require LWE (or equivalently, SIS by Regev's reduction).

On the other hand, the only hash functions which are provably PQ-CRHFs but not collapsing are contrived and require either complex oracles or un-tested conjectures. In summary, neither of the following scenarios would contradict any long-standing conjectures:
  Collapsing is ubiquitous, and every non-relativized PQ-CRHF is collapsing.
  Collapsing is rare, and the only standard-model collapsing hash functions are those requiring LWE.

On Random Oracle-based Hashes. One may argue that we can simply conjecture that some hash function is collapsing, and then trivially "build" collapsing hashes from that function. In particular, random oracles are collapsing and symmetric key hash functions such as SHA2 or SHA3 are often modeled as random oracles.

However, collapsing is an inherently quantum notion, which is potentially much harder to reason about than typical classically-defined notions such as collision resistance, pseudorandomness, etc. Indeed, the random oracle heuristic is based on extensive cryptanalytic studies of the hash functions with respect to classically-defined tasks. This is true even for works considering quantum attacks, where the cryptanalysis goal is still classically-defined, such as finding collisions. Some works have proved the post-quantum indifferentiability of these functions; while these are important for understanding security, they punt the cryptanalysis effort to the underlying round function, which again have largely been studied for their classical security.

Aside from idealized model justifications, we are not aware of any cryptanalysis effort on hash functions like SHA2 or SHA3 with regards to collapsing. Therefore, it seems plausible that the random oracle heuristic could hold on symmetric hash functions relative to classically-defined security properties, but fails for collapsing. For this reason, the current evidence for SHA2 or SHA3 being collapsing appears much weaker than evidence for their (post-quantum) collision resistance.

Our Results. In this work, we build a collapsing hash function H' from any PQ-CRHF H that satisfies a mild structural condition we call semi-regularity. Semi-regularity essentially means that no output has too many more pre-images than the "average" output. Note that H itself may be equivocal, and indeed a counter-example is semi-regular. Yet when plugged into our construction, the resulting H' is collapsing. We then show the following:

- Hash functions based on expanders, or a variety of LPN settings satisfy our regularity condition. In these cases, we thus achieve collapsing hashes under the same assumptions used to achieve post-quantum collision resistance.
- We do not know how to prove semi-regularity for symmetric hash function such as SHA2 or SHA3, but it is a natural property and it is reasonable to conjecture it holds for these functions. In particular, random oracles are semi-regular. Under this conjecture together with post-quantum collision resistance for SHA2 or SHA3, we obtain collapsing hashes. This is the first standard-model collapsing hash function from classically defined assumptions in Minicrypt; that is, they do not imply public key encryption.
- As an alternative approach, we show that H can be compiled into a collapsing hash function if it is optimally collision resistant, even if it is not semi-regular. Optimal collision resistance means that every polynomial-time algorithm can only find collisions with probability poly/|Range|. Note that the optimal generic classical and quantum collision-finding algorithms make T queries and succeed with probability $O(T^2)$/|Range| and $O(T^3)$/|Range|, respectively. Symmetric hashes such as SHA2 or SHA3 are often designed with the goal of achieving optimal collision resistance, and so we obtain collapsing hashes under the assumed optimal collision resistance of either of these functions.

As immediate corollaries of our results, we obtain post-quantum statistically hiding commitments and succinct arguments under any of the above assumptions. Our results show that semi-regularity is an important design consideration for constructing post-quantum hash functions.

1.1 why PQ-CRHFs are not Enough

For completeness, we give a brief explanation of why rewinding is problematic with PQ-CRHFs. Consider the following game. An adversary sends a hash y to the challenger. The challenger then flips a random bit b. The adversary then wins if it can produce a pre-image x of y such that the first bit of x is b. Clearly, an adversary could always set y to be the hash of an arbitrary x, in which case the first bit of x is b with probability ½. But can the adversary do better?

Classically, the answer is no, assuming the hash is collision resistant. Suppose for a given y that the adversary could win with probability ½+ϵ. Then it must win with probability at least ϵ conditioned on b=0, and also with probability at least ϵ conditioned on b=1. By running the adversary on b=0, rewinding until just after the adversary sends y, and running again on b=1, one obtains (with probability at least $\epsilon^2$) pre-images $x_0$ and $x_1$ whose first bits are 0,1 respectively. Since $x_0 \neq x_1$ and they are both pre-images of y, we have thus found a collision.

Quantumly, however, the above breaks down. Measuring $x_0$ on the first execution potentially destroys the quantum state of the adversary, meaning the adversary is no longer guaranteed to produce $x_1$. Ambainis et al.'s counter-example gives a hash function (relative to an oracle) where the probability to produce $x_1$ indeed becomes negligible. This creates problems for computationally binding commitments, where Ambainis et al.'s construction yields commitments that are equivocal, despite being binding in the usual sense. Likewise, this equivocation is problematic for many proof systems that demonstrate soundness by extracting two colliding transcripts from an adversary through rewinding.

Unruh's notion of collapsing hashes resolves this problem. Basically, the adversary's first message y results in the output of the hash being measured. Collapsing implies that this is indistinguishable from measuring the input. Measuring the input corresponds exactly to extracting $x_0$. While such extraction could potentially alter the quantum state, it cannot alter it in any detectable way. In particular this means the second run to recover $x_1$ must still succeed. This completes the reduction from collision resistance. Note that collision resistance is implied by collapsing as explained by Unruh, and hence collapsing implies the adversary can only win with probability ½+negl, as desired.

1.2 Techniques

We call a function $\leq \ell$-to-1 if no image has more than $\ell$ pre-images. We start with the following observation (Section 3):

Theorem 1 (Informal). For poly $\ell$, any $\leq \ell$-to-1 PQ-CRHF is also collapsing.

To see why this might be true, consider some $\leq \ell$-to-1 function H. Let $$|\phi\rangle \sum_x \alpha_x |x\rangle$$

be a superposition of inputs. Now consider measuring the output of H applied to $|\phi\rangle$ in superposition. If the measurement results in outcome y, then the state $|\phi\rangle$ collapses to the partially-measured state $$|\phi_y\rangle = \propto \sum_{x: H(x)=y} \alpha_x |x\rangle.$$

Since H is $\leq \ell$-to-1, the support of $|\phi_y\rangle$ contains at most $\ell$ different x.

Non-collapsing means that there is some operation M which distinguishes $|\phi_y\rangle$ from the result of measuring $|\phi_y\rangle$, the latter yielding a distribution over singletons $|x\rangle$ such that H(x)=y. Suppose that M actually simply accepted $|\phi_y\rangle$ and rejected all orthogonal states. In this case, if we measure $|\phi_y\rangle$—thus obtaining one pre-image x—and then apply M, there is a non-negligible chance we get back to $|\phi_y\rangle$. This is because $|\phi_y\rangle$ must have a significant overlap with $|x\rangle$, as $|\phi_y\rangle$ is the sum of only $\ell$ of the $|x\rangle$ vectors. But then if we were to measure again, we will get some x' that is also a pre-image. Moreover, $|\phi_y\rangle$ is itself not a singleton, since otherwise measuring it would have no effect and the distinguishing M would be impossible. Therefore there is a non-negligible chance that x≠x'. We thus obtain a collision.

We show that the above actually holds, no matter what $|\phi_y\rangle$ is, and no matter what M does, thus proving Theorem 1.

Generalization. Unfortunately, Theorem 1 appears somewhat limited. One may hope that symmetric hash functions such as SHA2 or SHA3, when restricted to a domain that is only slightly larger than the range, might be $\leq \ell$-to-1 for a polynomial $\ell$. After all, if we model them as random oracles, it is straightforward to show this. However, for other hash functions based on post-quantum assumptions, such as LPN or expanders, we cannot reasonably apply the random oracle heuristic due to significant structure. There are two potential problems:
1. The image might be a sparse subset of the co-domain. In this case, even if the hash function only compressed by a single bit, it may be exponentially-many-to-1 and Theorem 1 will not apply. It is not hard to modify Unruh's counterexample to give such a non-collapsing hash (relative to an oracle). We will give an example of where this is relevant below.
2. Looking ahead, we will see that LPN- and expander-based hash functions will eventually achieve some level of regularity, but this is only guaranteed once the input size is somewhat larger than the output. In such a case, the function is inherently exponentially-many-to-1.

We therefore propose a generalization of Theorem 1 which overcomes these two specific issues above. First, observe that any $\leq \ell$-to-1 hash on its own is not very useful, as it offers only minimal compression. However, by domain extension techniques, we can compile it into a hash function with arbitrary compression.

Imagine using Merkle-Damgård (MD) for domain extension, compiling a "small" hash H into a "big" hash H'. MD is already guaranteed to preserve collapsing. Imagine at each iteration, we only incorporate a single bit of the input at a time. Since the input to each iteration of H is just an output of H concatenated with a single bit, the number of possible inputs to H is never more than twice the number of possible outputs. In other words, H is 2-to-1 on average, over the set of possible inputs it will be evaluated on. If H were "sufficiently random looking", we would therefore expect that most outputs to H would only have relatively few pre-images, so that H could be $\leq \ell$-to-1 for a polynomial $\ell$.

We formalize this intuition: assuming H is "sufficiently regular", we show that we can make H "sufficiently random looking" by pre-pending it with a (almost) $\ell$-wise independent permutation for a polynomially-large $\ell$. Here, "sufficiently regular" essentially means that the most common output of H is only polynomially-more likely than the average output. This is formalized by a notion we call semi-regularity (Definition 4), which says roughly that the most common output is only a polynomial factor more likely than the "average" output. The result is the following:

Theorem 2. If H is a semi-regular PQ-CRHF, then it can be compiled into a collapsing hash function H'.

Applications. We show that several candidate post-quantum hash functions satisfy the necessary semi-regularity conditions, thus allowing us to construct novel collapsing hash functions:

Section 5: Hash functions based on LPN for a variety of low noise or high-hardness settings, matching the LPN assumptions under which plain post-quantum collision resistance exists.

Section 6: Hash functions based on walks on exponentially-large expander graphs, as proposed by Charles, Goren, and Lauter, abstracting earlier ideas. A particular instantiation allows for obtaining a collapsing hash function from the hardness of certain problems on isogenies over elliptic curves. Another candidate was recently proposed by Fuchs et al. based on Markov Triples.

Remark 1. The output of an expander-based hash is the label of the final node in the walk. In general, the set of labels may be sparse, in which case we would run into Problem 1. An example of such an expander is that of Fuchs et al., where the range is $\mathbb{Z}_p^3$ but the size of the graph is only $O(p^2)$. Likewise, the Charles et al. expander from isogenies has labels in $\mathbb{Z}_p^2$ but the graph size is only $O(p)$. For this reason, in the case of expander hashes, we need the full power of Theorem 2.

Remark 2. We emphasize that we do not prove the constructions of prior works are collapsing. Instead, we only prove semi-regularity, which allows us to compile (through a Merkle-Damgård-like construction) into a collapsing hash. We leave as an interesting open question whether the base constructions could be proven collapsing.

Remark 3. Other instantiations have been proposed, such as the use of LPS graphs and Morgenstern graphs. Some weaknesses have been shown in these graphs, though there are still versions that remain secure. For any version that is post-quantum collision resistant, our result immediately lifts it to a hash that is collapsing.

Symmetric Key Hash Functions. We do not know how to prove that symmetric hash functions such as SHA2 or SHA3 are semi-regular, and leave this as an interesting open question. However, we observe that random oracles are readily shown to be semi-regular. Thus, either of two things happen:

The hash function is not semi-regular, therefore violating the random oracle heuristic for a classically defined statistical property. This case could be considered as demonstrating a significant weakness of the hash function.

The hash function is semi-regular, in which we can compile it into a collapsing hash function based on the assumed (post-quantum) collision resistance of the function, which is a widely studied security property.

Thus we establish semi-regularity as an important design principle in the design of symmetric-key based hash functions.

We also provide additional evidence that SHA2 or SHA3 can be compiled into a collapsing hash. Concretely, SHA2 and SHA3 are widely believed to have optimal collision resistance, meaning that any polynomial-time algorithm only has a polynomial advantage over the trivial algorithm of guessing two random inputs and hoping they collide. The assumed optimal collision resistance is the basis for the current parameter settings of these functions. If SHA2 or SHA3 did not have optimal collision resistance, it would show that the parameter settings are too aggressive, and this would be considered a serious weakness.

In Section 7, we show that any optimally (post-quantum) collision resistant hash function that compresses by only a few bits is in fact collapsing, even if it is not semi-regular. Thus under the highly likely optimal collision resistance of SHA2 or SHA3, we obtain a collapsing hash function.

1.3 Collapsing from Group Actions

A group action is a relaxation of a standard cryptographic group, roughly allowing exponentiation but not multiplication. The advantage of such a restricted structure is that it prevents Shor's algorithm, and therefore maintains plausible post-quantum security. This was observed concurrently by Couveignes and Rostovtsev and Stolbunov, both works also proposing an instantiation of plausible post-quantum group actions using isogenies over elliptic curves.

The restricted structure of group actions preserves plausible post-quantum security, but it also restricts applications. In particular, the usual way of obtaining collision resistance from discrete logarithms, namely $$(x,y) \mapsto g^x h^y,$$

no longer can be computed without the ability to multiply elements. One could consider another natural construction, namely:

$$(x, b) \mapsto \begin{cases} g^x & \text{if } b = 0 \\ h^x & \text{if } b = 1 \end{cases},$$

where b is a single bit. This is a 2-to-1 function where finding collisions is intractable by the hardness of discrete logarithms on the group action. For group actions based on isogenies, the discrete logarithm problem is exactly the problem of computing isogenies. However, with currently known group actions from isogenies, the bit-length of $g^x$ is roughly twice the bit-length of x, meaning the images are sparse and the function is not compressing despite being 2-to-1. Such functions are not useful for hashing. It remains a major open question whether collision resistant compressing hashing can be based on the discrete log problem for group actions of this form, and in particular if such collision resistance can be based on the hardness of computing isogenies.

Call a group action compact if $g^x$ has the same bit length as x. For compact group actions, the above hash function would be compressing, and collision resistance would follow from the hardness of computing discrete logarithms. Then applying Theorem 1, we immediately conclude that compact group actions also yield collapsing hash functions. We leave finding a plausible post-quantum compact group action as an intriguing open question.

Remark 4. The isogeny-based hash previously proposed relies on a different problem, namely finding a non-trivial cycle on the isogeny graph. The hardness of finding cycles is a stronger assumption that the hardness of computing isogenies.

1.4 Collapsing from Arbitrary Collision Resistance

While it seems most natural hash functions are semi-regular (at least in some parameter settings), it is not hard to construct contrived hash functions that are not semi-regular. Therefore, our restriction to semi-regular functions potentially limits the applicability of our approach. An interesting conjecture is the following:

Conjecture 1. From any PQ-CRHF, one can build a collapsing hash function.

Removing the semi-regularity restriction seems challenging. Consider a construction of H' from H where the output of H' is just the concatenation of t outputs of H on different inputs. More generally, perhaps the output of H' is an injective function applied to t outputs of H. This structure would allow for immediately translating an H' collision into an H collision. It seems difficult to devise an H' that is not of this form while still proving the collision resistance of H' (let alone collapsing) just on the collision resistance of H.

For an H' of this form, if H has n-bit outputs, H' has tn-bit outputs, and therefore H' must have at least (tn+1)-bit inputs in order to be compressing. Suppose H was not semi-regular, and had some outputs that represented an f-fraction of the domain, where f is much larger than the fraction for "average" outputs, which we will denote g. Then H' will have (information-theoretically) outputs that represent an approximately $f^t$-fraction of the domain, where the average output would be approximately $g^t$. Thus H' is not semi-regular, and in fact has even worse regularity if t>1.

Therefore, it seems challenging, if not impossible, to generically remove semi-regularity from a collision resistant hash function. One may hope to prove H' is collapsing despite not being semi-regular. But there would be little hope of using our techniques alone to prove collapsing, since the calls to H could be on inputs mapping to the highly-likely outputs, in which case H is super-poly-to-1.

On the other hand, our situation can be seen as roughly analogous to the case of constructing pseudorandom generators (PRGs) from one-way functions (OWFs). Specifically, Goldreich, Krawczyk, and Luby initially show that PRGs can be constructed from any regular one-way function. This was then improved to PRGs from arbitrary one-way functions by Håstad et al. Likewise, our hope is that future ideas will allow for proving Conjecture 1.

1.5 Concurrent and Independent Work

In a current and independent work, Cao and Xue also study collapsing hash functions. Their core result is identical to Theorem 1, namely that collision resistance when the number of pre-images is polynomially bounded implies collapsing. Somewhat analogous to Theorem 2, they also identify a relaxation they call almost-regularity, and show that almost-regular PQ-CRHFs can be used to build collapsing hashes. Almost-regularity is a somewhat stronger requirement than semi-regularity, resulting in fewer applications. Prior work shows that the SIS hash function is almost-regular, thus giving a collapsing hash function from SIS, arriving at the same feasibility result as prior work though through entirely different means. Our work gives several applications not covered in prior work, namely collapsing hashes from LPN, expanders, and optimal collision resistance. The former two applications rely on our more general Theorem 2.

2 Preliminaries

Quantum Computation. We give a very brief overview of quantum computation. A pure state is a unit column vector, usually denoted in ket notation as $|\psi\rangle$, in a complex Hilbert space $\mathcal{H}$. The conjugate transpose of $|\psi\rangle$, a row vector, is denoted in bra iotation as $\langle\psi|$. We usually think of $\mathcal{H}$ as a product of n 2-dimensional spaces, which are called qubits. For each qubit, we will fix some preferred basis $\{|0\rangle, |1\rangle\}$, which we call the computational basis. An n qubit space is therefore associated with the set of n-bit strings, and we say that $|\psi\rangle$ is a superposition over n-bit strings.

A mixed state is a probability distribution over pure states. If state $|\omega_i\rangle$ occurs with probability $p_i$, the mixed state is characterized by a density matrix, given by $\Sigma_i p_i |\psi_i\rangle\langle\psi_i|$. Mixed states are usually denoted as $\rho$.

A quantum algorithm contains two types of operations: unitary transformations and projective measurements. A unitary is a linear operator U such that $UU^\dagger = I$, where $U^\dagger$ is the Hermitian transpose. The action of U on $|\psi\rangle$ is given by $U|\psi\rangle$. A projective measurement is specified by a set of projections $\mathcal{P} = (P_1, \ldots, P_r)$ such that $\Sigma_i P_i = I$. When applying measurement $\mathcal{P}$ to state $|\psi\rangle$, the result is to output i with probability $p_i$ and the quantum system "collapses" to the state $|\psi_i\rangle$, where:

$$|\psi_i\rangle := \frac{P_i|\psi\rangle}{\sqrt{\langle\psi|P_i|\psi\rangle}}, \; p_i := \langle\psi|P_i|\psi\rangle.$$

When the measurement is applied to a mixed state $\rho$, the result is to output i with probability $p_i$ and the system collapses to $\rho_i$, where $$\rho_i := \frac{1}{p_i} P_i \rho P_i, \; p_i := Tr(P_i \rho).$$

For a qubit, measurement in the computational basis is the measurement $(|0\rangle\langle 0|, |1\rangle\langle 1|)$. For a projective measurement $\mathcal{P}$ acting on pure state $|\psi\rangle$ or mixed state $\rho$, we will write (i, $\rho'$)← $\mathcal{P}(|\psi\rangle)$ or (i, $\rho'$)← $\mathcal{P}(\rho)$ to denote the output i of applying the measurement $\mathcal{P}$ to $\rho$, together with the resulting state $\rho'$. Sometimes we will ignore the actual result of measurement i, focusing just on the resulting state, in which case we write $\rho' \leftarrow \mathcal{P}(|\psi\rangle)$ or $\rho' \leftarrow \mathcal{P}(\rho)$. Other times, we will ignore the resulting state and just focus on the measurement outcome, in which case we write i← $\mathcal{P}(|\psi\rangle)$ or i→ $\mathcal{P}(\rho)$.

Consider a joint system $\mathcal{H} = \mathcal{H}_0 \otimes \mathcal{H}_1$, and applying two measurements $\mathcal{P}_0, \mathcal{P}_1$ to the sub-systems $\mathcal{H}_0, N_1$. We write the resulting measurement as $\mathcal{P}_0 \otimes \mathcal{P}_1$.

Efficient quantum algorithms are given by a polynomial number of unitaries from some constant-sized universal set and a polynomial number of computational basis measurements. We say such algorithms are quantum polynomial time (QPT).

Throughout this work, we will make use of the following fact:

Fact 1. Any efficient quantum computation over a space $\mathcal{H}$ can be turned into an efficient computation that is also a projective measurement $\mathcal{P}$ over a space $\mathcal{H} \otimes \mathcal{H}'$ for some $\mathcal{H}'$.

Hash Functions. A hash function will be specified by a family of distributions $\mathcal{H} = (\mathcal{H}_\lambda)_\lambda$ over classically efficiently computable functions $h: \mathcal{X}_\lambda \to \mathcal{Y}_\lambda$ between some domain $\mathcal{Y}_\lambda$ and co-domain $\mathcal{Y}_\lambda$. We require non-trivial compression, namely that $|\mathcal{X}_\lambda| \geq 2 \times |\mathcal{Y}_\lambda|$. We will consider two security properties. The first is plain collision resistance but again quantum attackers:

Definition 1 (PQ-CRHF). $\mathcal{H}$ is a post-quantum collision resistant hash function if, for every QPT algorithm $\mathcal{A}$, there exists a negligible function negl such that $$Pr\begin{bmatrix} x_0 \neq x_1, \text{and} & h \leftarrow \mathcal{H}_\lambda \\ h(x_0) = h(x_1) & (x_0, x_1) \leftarrow A(h) \end{bmatrix} < negl(\lambda).$$

The second definition is collapsing, due to Unruh. Consider a superposition $|\psi\rangle$ over $\mathcal{X}_\lambda$. Consider two measurements:

$\mathcal{M}\mathcal{X} = (|x\rangle\langle x|)_{x \in \mathcal{X}_\lambda}$, which is just the computational basis measurement of $|\psi\rangle$.

$\mathcal{M}_y^h = (\Sigma_{x:h(x)=y}|x\rangle\langle x|)_{y \in \mathcal{Y}_\lambda}$. This is the measurement corresponding to the following First map $|\psi\rangle = \Sigma_x \alpha_x |x\rangle$ to $|\psi_1\rangle = \Sigma_x \alpha_x |x\rangle |h(x)\rangle$, a superposition over $\mathcal{X}_\lambda \times \mathcal{Y}_\lambda$.

Measure the $\mathcal{Y}_\lambda$ registers to obtain y. The $|\psi_1\rangle$ collapses to a state proportional to $\Sigma_{x:h(x)=y} \alpha_x |x\rangle |y\rangle$.

Discard the $\mathcal{Y}_\lambda$ registers.

The collapsing definition essentially says that, for any superposition of inputs the adversary can produce, if either $\mathcal{M}\mathcal{X}$ or $\mathcal{M}_y^h$ is applied to the state, it is computationally infeasible to tell which. This holds even if the adversary maintained an arbitrary internal state that could be entangled with the superposition of inputs.

Definition 2 (Collapsing Hash). $\mathcal{H}$ is a collapsing hash function if, for every QPT algorithm $\mathcal{A} = (\mathcal{A}_0, \mathcal{A}_1)$, there exists a negligible function negl such that $|Pr[1 \leftarrow \mathcal{A}_1 \circ (I \otimes \mathcal{M} \mathcal{X}) \circ \mathcal{A}_0(h)] - Pr[1 \leftarrow \mathcal{A}_1 \circ (I \otimes \mathcal{M}_y^h) \circ \mathcal{A}_0(h)]| < negl(\lambda),$ where both probabilities are over the choice of $h \leftarrow \mathcal{H}_\lambda$. We call the quantity on the left above the advantage of $\mathcal{X}$. Note that $\mathcal{X}_0$ outputs both a (quantum) internal state and a superposition over $\mathcal{X}_\lambda$. The internal state is passed unaffected to $\mathcal{A}_1$, as is the result of applying $\mathcal{M}\mathcal{X}$ or $\mathcal{M}_y^h$ to the superposition over $\mathcal{X}_\lambda$.

Definition 3 (t-wise independence). A family $\Pi$ of injections from $\mathcal{X}$ to $\mathcal{Y}$ ($|\mathcal{Y}| \geq |\mathcal{X}|$) is a t-wise $\delta$-dependent injection if, for any distinct $x_1, \ldots, x_t \in \mathcal{X}$, the distribution $(\pi(x_1), \ldots, \pi(x_t))$ for $\pi \leftarrow \Pi$ is $\delta$-close to t uniformly random distinct elements of $\mathcal{Y}$.

Distributions and Rényi Entropy. For a distribution D over a finite set I, and $\alpha > 1$, define the Rényi Entropy as $$H_\alpha(D) := -\frac{1}{\alpha - 1} \log\left(\sum_{i \in I} Pr[i \leftarrow D]^\alpha\right)$$

$$H_\infty(D) := -\log \max_{i \in I} Pr[i \leftarrow D]$$

The choice of base in the logarithm is irrelevant for our purposes, as long as the same base is used for all $\alpha$. For our purposes, it will be convenient to map Rényi entropy to the norm of the probability vector. Write $$\|D\|_\alpha := \left(\sum_{i \in I} Pr[i \leftarrow D]^\alpha\right)^{1/\alpha} = 2^{-\left(1 - \frac{1}{\alpha}\right) H_\alpha(D)}$$

$$\|D\|_\infty := \max_{i \in I} Pr[i \leftarrow D] = 2^{-H_\infty(D)}$$

For $\beta > \alpha \geq 1$, we have the following inequalities, where the left and right inequalities are identical just phrased in terms of entropies vs vector norms:

$$H_\alpha(D) \geq H_\beta(D) \quad (1)$$

$$(\|D\|_\alpha)^{\frac{\alpha}{\alpha-1}} \leq (\|D\|_\beta)^{\frac{\beta}{\beta-1}}$$

-continued $$\left(1 - \frac{1}{\alpha}\right) H_\alpha(D) \leq \left(1 - \frac{1}{\beta}\right) H_\beta(D) \quad (2)$$

$$\|D\|_\alpha \geq \|D\|_\beta$$

$$H_\alpha(D) \leq \log|I| \quad (3)$$

$$\|D\|_\alpha \geq |I|^{-1}$$

Let $\Delta_\alpha(D) := H_\alpha(D) - H_\infty(D)$ to be the Entropy Gap of D. When a is not specified, we will mean $\alpha=2$.

For a finite set $\mathcal{X}$, we abuse notation and use $\mathcal{X}$ to denote the uniform distribution over $\mathcal{X}$. For a function h: $\mathcal{X} \to \mathcal{Y}$ and a distribution D on $\mathcal{X}$, we let h(D) be the distribution obtained by sampling x←D and then outputting h(x). We also define $H_\alpha(h) := H_\alpha(h(\mathcal{X}))$, $\|h\|_\alpha := \|h(\mathcal{X})\|_\alpha$, and $\Delta_\alpha(h) := \Delta_\alpha(h(\mathcal{X}))$.

3 from Non-Collapsing to Equivocation

Here, we prove that a failure to be collapsing leads to equivocation. We consider the following setup:

A secret set S of size $\ell$, which is a subset of some set $\mathcal{U}$.

Another set $\mathcal{V}$.

A state ρ that is a superposition over pairs (v, s)∈ $\mathcal{V} \times S$.

A binary-outcome projective measurement $\mathcal{P} = (P, I-P)$.

Our goal is to, starting in the state ρ, obtain two distinct values i, j∈ S. The only operations we can perform are the measurement $\mathcal{P}$ and the measurement in the computational basis for $\mathcal{U}$. Without any further promises, this goal is impossible. By applying $\mathcal{U}$ to ρ, one obtains a single element of S. If $\mathcal{P}$, say, commutes with U, then no sequence of operations will ever change the state, and we will never obtain a second element.

Therefore, we are given the promise that $\mathcal{P}$ is sufficiently non-commuting with $\mathcal{U}$. Concretely, we are promised that:

$$|Pr[1 \leftarrow \mathcal{P}(\rho)] - Pr[1 \leftarrow (\mathcal{P} \circ (I \otimes \mathcal{U}))(\rho)]| \geq \epsilon$$

for some non-negligible quantity ε. In other words, $\mathcal{P}$ distinguishes between ρ and the result of measuring ρ in the computational basis for $\mathcal{U}$.

The Algorithm. Since we are now only allowed to use $\mathcal{U}$ and $\mathcal{P}$, there is nothing that can be done except alternate them. Concretely, we apply $\mathcal{U}$, and then $\mathcal{U}$ again. We will show that, with non-negligible probability, the two applications of $\mathcal{U}$ output distinct elements of S.

Lemma 1. For $\ell$, S, ρ, $\mathcal{P}$, $\mathcal{U}$, $\mathcal{V}$ as defined above, $$Pr\left[\begin{array}{l} i, j \in S \\ i \neq j \end{array} : \begin{array}{l} (i, \rho') \leftarrow (I \otimes \mathcal{U})(\rho) \\ \rho'' \leftarrow \mathcal{P}(\rho') \\ j \leftarrow (I \otimes \mathcal{U})(\rho'') \end{array}\right] \geq \frac{2}{\ell - 1} \left| \begin{array}{l} Pr[1 \leftarrow \mathcal{P}(\rho)] \\ -Pr[1 \leftarrow (\mathcal{P} \circ (I \otimes \mathcal{U}))(\rho)] \end{array} \right|^2.$$

Before proving Lemma 1, we observe that it is tight. Let q be the quantity on the left, and r the quantity inside |•| on the right. Consider the case where $\mathcal{V}$ is empty, ρ is the pure state $|\psi\rangle := \ell^{-1/2} \Sigma_{i \in S} |i\rangle$, and P is the projection onto $|\psi\rangle$. In this case, Applying $\mathcal{P}$ to $|\psi\rangle$ outputs 0 with certainty. Meanwhile, measuring $|\psi\rangle$ gives a random $|i\rangle$, and applying $\mathcal{P}$ to any $|i\rangle$ will give 0 with probability $1/\ell$. Therefore, $r = 1 - 1/\ell$, and the right-hand side becomes $2(\ell-1)/\ell^2$.

On the other hand, for computing q, there are two cases: (1) if applying $\mathcal{P}$ to $|i\rangle$ outputs 0, or (2) it outputs 1. If it outputs 0 (which occurs with probability $1/\ell$), then the state is back to $|\psi\rangle$, and measuring again will give an j≠i with probability $1-1/\ell$. If it outputs 0 (which occurs with probability $1-1/\ell$), then the state becomes $|i\rangle - \ell^{-1/2}|\psi\rangle$. In this case, a simple calculation shows that measurement will give j≠i with probability $1/\ell$. Taken together, the overall probability q of obtaining a j≠i is exactly $2(\ell-1)/\ell^2$, exactly matching the right-hand side.

We now give the proof of Lemma 1.

Proof. We focus on the case of pure states, the mixed state setting then following from convexity. Therefore we assume $\rho = |\psi\rangle\langle\psi|$ for some pure state $|\psi\rangle = \Sigma_{v,i} \alpha_{v,i} |v, i\rangle$.

We first analyze q. The probability of obtaining i in the first measurement is $p_i = Tr[(I \otimes |i\rangle\langle i|) \rho]$, in which case ρ' becomes $$\rho_i := \frac{1}{p_i} (I \otimes |i\rangle\langle i|) \rho (I \otimes |i\rangle\langle i|)$$

Now we apply $\mathcal{P}$, and disregard the output of the measurement. The resulting mixed state is $\rho_i' := P\rho_i P + (I-P)\rho_i(I-P)$. Now we apply $(I \otimes \mathcal{U})$ again. The probability of obtaining j is $Tr[(I \otimes |j\rangle\langle j|) \rho_i']$. Summing over all i∈ S and j∈ S\{i}, we have that the probability of obtaining distinct i, j∈ S is q where $$q = Tr\left[\sum_{i,j \in S, i \neq j} \begin{array}{l}(I \otimes |j\rangle\langle j|) P (I \otimes |i\rangle\langle i|) \rho (I \otimes |i\rangle\langle i|) P \\ + (I \otimes |j\rangle\langle j|)(I - P)(I \otimes |i\rangle\langle i|) \rho (I \otimes |i\rangle\langle i|)(I - P)\end{array}\right]$$

$$= 2Tr\left[\sum_{i,j \in S, i \neq j} (I \otimes |j\rangle\langle j|) P (I \otimes |i\rangle\langle i|) \rho (I \otimes |i\rangle\langle i|) P\right]$$

$$= 2Tr\left[\sum_{\substack{i,j \in S, i \neq j \\ v,v' \in \mathcal{V}}} \alpha_{v,i} \alpha_{v',i}^\dagger (I \otimes |j\rangle\langle j|) P (|v\rangle\langle v'| \otimes |i\rangle\langle i|) P\right]$$

$$= 2\left[\sum_{\substack{i,j \in S, i \neq j \\ v,v' \in \mathcal{V}}} \alpha_{v,i} \alpha_{v',i}^\dagger (\langle v'|\langle i|) P (I \otimes |j\rangle\langle j|) P (|v\rangle|i\rangle)\right]$$

$$= 2\left[\sum_{\substack{i,j \in S, i \neq j \\ v,v',v'' \in \mathcal{V}}} \alpha_{v,i} \alpha_{v',i}^\dagger \langle v', i|P|v'', j\rangle \langle v'', j|P|v, i\rangle\right].$$

Then if we define w as the vector indexed by tuples (i,j,v''), i≠j such that $w_{(i,j,v'')} := \Sigma_v \alpha_{v,i} \langle v'', j|P|v, i\rangle$, we have that $q = 2|w|^2$.

Next we analyze the right hand side, r, of Lemma 1. We have $$r = Tr[P\rho] - Tr\left[P \sum_{i \in S} (I \otimes |i\rangle\langle i|) \rho (I \otimes |i\rangle\langle i|)\right]$$

$$= \left[\sum_{\substack{i,j \in S \\ v,v' \in \mathcal{V}}} \alpha_{v,i} \alpha_{v',j}^\dagger \langle v'|\langle i|P|v\rangle|j\rangle - \sum_{\substack{i \in S \\ v,v' \in \mathcal{V}}} \alpha_{v,i} \alpha_{v',i}^\dagger \langle v'|\langle i|P|v\rangle|i\rangle\right]$$

$$= \left[\sum_{\substack{i,j \in S, i \neq j \\ v,v' \in \mathcal{V}}} \alpha_{v,i} \alpha_{v',j}^\dagger \langle v'|\langle i|P|v\rangle|j\rangle\right].$$

Then if we define x as the vector $x_{(i,j,v'')}:=\alpha_{v'',j}$, we have that $r=x\cdot w$. Note that $$|x|^2 = \sum_{\substack{i,j\in S, i\neq j \\ v''\in \mathcal{V}}} |\alpha_{v'',j}|^2 = \sum_{j\in S, v''\in \mathcal{V}} (\ell-1)|\alpha_{v'',j}|^2 = \ell-1.$$

Therefore, by the Cauchy-Schwartz inequality, we have that is $|w|^2|x|^2 \geq |w\cdot x|^2$. The lemma follows.

3.1 Application: Hashing with Small Compression.

We now use Lemma 1 to show that any hash function which is $\leq \ell$-to-1 for a polynomial $\ell$ is collapsing.

Theorem 1. Let $\mathcal{H}$ be a post-quantum collision-resistant hash function with domain $\mathcal{X}$, and $\ell$ a polynomial. Suppose that, with overwhelming probability over the choice of $h \leftarrow \mathcal{H}$, that h is $\leq \ell$-to-1. Then $\mathcal{H}$ is collapsing.

Proof. Assume toward contradiction that $\mathcal{H}$ is not collapsing. Let $\mathcal{A} = (\mathcal{A}_0, \mathcal{A}_1)$ be the adversary for the collapsing game, with non-negligible advantage $\epsilon$. We will think of $\mathcal{A}_1$ as being a projective measurement on the joint system $\mathcal{V} \times \mathcal{X}_\lambda$, where $\mathcal{V}$ is the adversary's internal state.

Observe that $\mathcal{M}\mathcal{X}$ is equivalent to the composition of $\mathcal{M}\mathcal{Y}$ followed by $\mathcal{M}\mathcal{X}$, since the domain element uniquely determines the range element. Therefore, we can think of both sides of the collapsing experiment as applying $\mathcal{M}\mathcal{Y}$, and then the only difference is whether an additional $\mathcal{M}\mathcal{X}$ is applied. We will therefore always think of the output of $\mathcal{A}_0$ as having $\mathcal{M}\mathcal{Y}$ applied.

For a fixed h and result y from $\mathcal{M}\mathcal{Y}$, suppose $\mathcal{A}_1$ has a distinguishing advantage $\epsilon_h$. Then we can apply Lemma 1 to extract two pre-images of y (and hence a collision) with probability at least $2\epsilon_h^2/(\ell-1)$. By averaging over all h and y and invoking convexity, we see that the overall probability of finding a collision is at least $2\epsilon^2/(\ell-1)$, which is non-negligible.

By combining with the fact that standard domain extension works for collapsing hash functions, we have the following corollary:

Corollary 1. Assuming the existence of $\leq \ell$-to-1 PQ-CRHFs for a polynomial $\ell$, there exist collapsing hash functions for arbitrary domains.

4 The Main Theorem

We now generalize the $\leq \ell$-to-1 case to a somewhat more general class of hash functions. The main challenge, of course, is that general hash functions may not be $\leq \ell$-to-1 for any polynomial $\ell$. This can be a problem even if the domain is only slightly larger than the co-domain. Here, we show how to somewhat relax the conditions on the hash function.

Definition 4. Let $\mathcal{H} = (\mathcal{H}_\lambda)_\lambda$ be a family of hash functions with domain $\mathcal{X}_\lambda$ and co-domain $\mathcal{Y}_\lambda$. We say that $\mathcal{H}$ is semi-regular if there exists a polynomial r and negligible negl such that $$\Pr_{h \leftarrow \mathcal{H}_\lambda}[\Delta_2(h) > \log r(\lambda)] < negl(\lambda).$$

Equivalently, $\|h\|_\infty \leq r(\lambda) \times \|h\|_2^2$, except with negligible probability.

For a function h, we will call $\|h\|_\infty / \|h\|_2^2$ the regularity of h. A semi-regular hash function is therefore one where the regularity is a polynomial except with negligible probability.

Main Theorem. We now give our main theorem.

Theorem 2. If there exists a semi-regular PQ-CRHF, then there exists a collapsing hash function.

Figure 1:
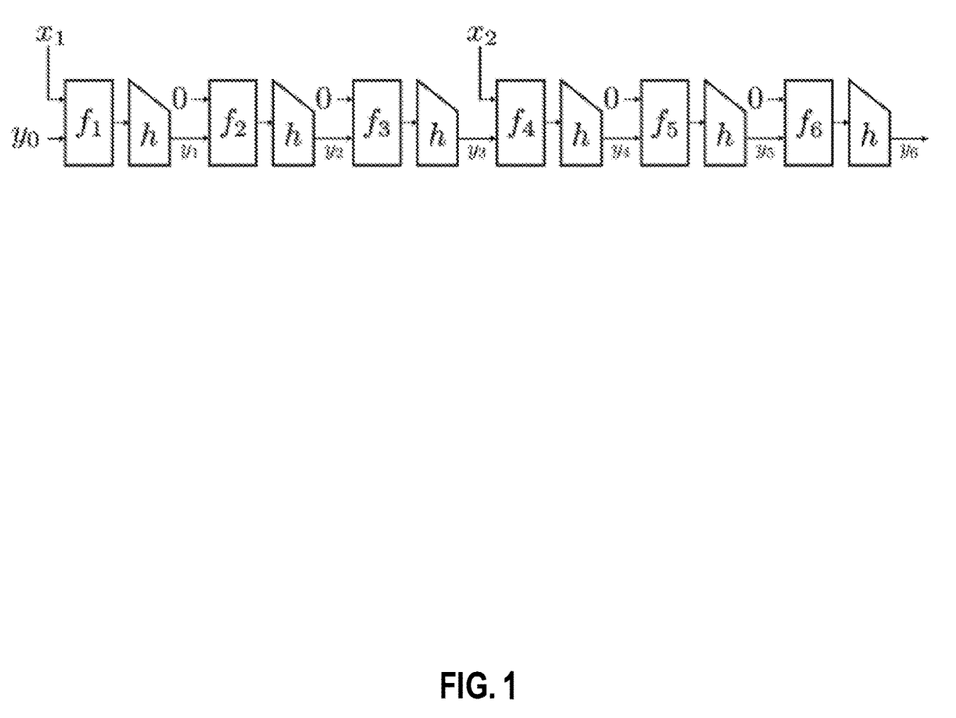
FIG. 1 illustrates an example method for the first several iterations of Construction 1 for t=3, according to one embodiment.

The remainder of this section is devoted to proving Theorem 2. We start by considering the following hash function:

Construction 1. Let $\mathcal{H}$ be a family of post-quantum collision resistant hash functions with domain $\mathcal{X}_\lambda$ and co-domain $\mathcal{Y}_\lambda$. For parameters $\ell \in \mathbb{Z}$ $\delta \in [0,1]$, let $\mathcal{F}$ be a $\ell$-wise $\delta$-dependent injection with domain $\mathcal{Y}_\lambda \times \{0,1\}$ and co-domain $\mathcal{X}_\lambda$. Then for any polynomial $m=m(\lambda)$, we construct the following function family $\mathcal{H}'$ with domain $\{0,1\}^m$ and co-domain $\mathcal{Y}_\lambda$, where $h' \rightarrow \mathcal{H}'$ is sampled as follows: sample $h \leftarrow \mathcal{H}$ and for $i=1, \ldots, m\times t$, sample $f_i \leftarrow \mathcal{F}$, where t is a parameter to be specified later. Also fix an arbitrary $y_0 \in \mathcal{Y}_\lambda$. Then output $h':\{0,1\}^m \rightarrow \mathcal{Y}_\lambda$ defined as:

For $i=1, \ldots, u=(m-1)\times t+1$:
  Let $z_i = y_{i-1} \| x_j$ if $i=t(j-1)+1$, otherwise let $z_i = y_{i-1} \| 0$.
  Let $y_i = h(f_i(z_i))$
Output $y_u$ The operation of h' is also given in FIG. 1.

Remark 5. Note that Construction 1 is only defined for a bounded domain, since it needs independent $f_i$ for each application of h. However, we can set m to be large enough so that $2^m \gg \mathcal{Y}_\lambda$, obtaining a compressing collapsing function. Then we can plug the result into a plain Merkle-Damgård or other domain extender, which are known to preserve collapsing. The result is an arbitrary-domain hash function that is collapsing.

Remark 6. Observe that some iterations of Construction 1 incorporate bits of the input into the $z_i$, while others just incorporate 0's. This is mostly an artifact of our proof of collapsing, and it is unclear if it is strictly needed. Looking ahead, in each iteration that incorporates an input bit, the number of possible $z_i$ values potentially doubles, while in other iterations, we show that the number of possible $z_i$ values decreases with noticeable probability. By inserting sufficiently many 0 iterations, we can make sure the number of possible $z_i$ values never gets too large, which we can then use to apply Lemma 1.

For the remainder of the proof, we omit $\lambda$ subscripts and write $\mathcal{X} = \mathcal{X}_\lambda$ and $\mathcal{Y} = \mathcal{Y}_\lambda$ to keep notation simple. Let $\mathcal{Y}_i$ be the set of possible values for $z_i$ as x ranges over all possible inputs, and $N_i = |\mathcal{Y}_i|$. Let $M_i$ be the number of possible values for $y_i$. Observe that $N_i = 2M_i$ for $i=t(j-1)+1$ and $N_i = M_i$ otherwise. Define the following quantities:

$$r = \|h\|_\infty / \|h\|_2^2 \tag{4}$$

$$\ell = \max(2re, 3\log|\mathcal{Y}|) \tag{5}$$

$$\delta = |\mathcal{Y}|^{-2} \binom{|\mathcal{Y}|}{\ell}^{-1} \tag{6}$$

$$t = 200\ell \tag{7}$$

Lemma 2. Except with negligible probability over the choice of h, $f_i$, the following hold:
  $N_i \leq \|h\|_2^{-2}$ for all i
  For all i, the function $h_i(y) = h(f_i(y))$, when restricted to $\mathcal{Y}_{i-1}$, is $< \ell$-to-1.

Before proving Lemma 2, we first demonstrate that it allows for proving Construction 1 is collapsing. Note that only the second bullet is needed to prove collapsing; the first bullet is facilitates our proof of Lemma 2 by induction.

Construction 1 is just Merkle-Damgård, composed of u functions $h_i(y)=h(f_i(y))$, where each $h_i$ has domain $\mathcal{Y}_{i-1}$ and the input to the hash has a number of zeros inserted between the various input bits. Each of the $h_i$ are collision resistant since the $f_i$ are injective. By Lemma 2, each of the $h_i$ are also $<\ell$-to-1 when restricting to the set of possible inputs. Hence by Theorem 1, each of the $h_i$ are collapsing on their restricted domains. Unruh shows that Merkle-Damgård is collapsing if the component $h_i$ are collapsing, hence Construction 1 is collapsing. The exact same proof works here, the only difference is that the $h_i$ are only collapsing on the outputs of $h_{i-1}$, but are potentially not collapsing on the entire domain $\mathcal{Y}_\lambda \times \{0, 1\}$. Nevertheless the same proof works here: imagine $y_u$ is measured. Now measure $z_u$, then $z_{u-1}$, then $z_{u-2}$, etc, until we measure $z_1$. The application of each measurement is undetectable by the collapsingness of the $h_i$ on their restricted domains. By the time we have measured all of the $z_i$'s, we have measured the entire input. Hence measuring $y_u$ (the output of h') is indistinguishable from measuring the input x.

For completeness, we work out the proof here. We need to show that measuring the final output $y_u$ vs measuring the input x is computationally indistinguishable. We will do this through a hybrid argument. Let $\mathcal{A} = (\mathcal{A}_0, \mathcal{A}_1)$ be a collapsing adversary for $\mathcal{H}_0'$, where the probability of distinguishing the measurement $\mathcal{M} x_\ell^{h'}$ from $\mathcal{M} \mathcal{X}$ is a non-negligible $\epsilon$.

Consider evaluating h' on a quantum superposition, writing the output $y_u$ to a new register $Y_u$. During iteration j, a number of intermediate values will be stored in a register, including $z_j$ which will be stored in a register $Z_j$. After the final output $y_u$ of h' is produced and written to a register $Y_u$, all the intermediate registers including the $Z_j$ will be uncomputed.

In Hybrid i, register $Y_u$ is measured to give $y_u$, and also registers $Z_j$ for $j=i, \ldots, u$ are all measured before uncomputation, giving $z_j$. Let $p_i$ be the probability A outputs 1 in Hybrid i.

Hybrid u+1 means none of the $Z_j$ registers are measured, whereas in Hybrid 1, all of the $Z_j$ are measured, which is equivalent to measuring the input registers. Thus $|p_i - p_{u+1}| = \epsilon$, by our assumption that $\mathcal{A}$ is a collapsing adversary. For each i, we obtain a collapsing adversary $\mathcal{B}^{(i)} = (\mathcal{B}_0^{(i)}, \mathcal{B}_1^{(i)})$ for $h_i$ with advantage $\epsilon_i = |p_i - p_{i+1}|$. $\mathcal{B}_0^{(i)}(h_i)$ works as follows:

It first chooses $f_j$ for $j \neq i$, and constructs h' as above. Then it simulates $\mathcal{A}_0(h')$.

$\mathcal{A}_0$ produces $\rho_{state,X}$, where state is a register containing the adversary's state that gets forwarded to the next stage, and X is a register containing a superposition of inputs to h'.

$\mathcal{B}_0^{(i)}$ evaluates h' on register X, and measures the registers $Z_{i+1}, \ldots, Z_u$. During the uncomputation step, it uncomputes $Y_u$ and all the registers containing all the intermediate values, except for the register $Z_i$.

$\mathcal{B}_0^{(i)}$ then outputs the joint system $\rho_{state',Z_i}$, where state' = (state, X).

$\mathcal{B}_1^{(i)}$ upon receiving $\rho_{state',Z_i}$, uncomputes the $Z_i$ registers, obtaining the system $p_{state} = \rho_{state,X}$, which it feeds into $\mathcal{A}_1$. It outputs whatever $\mathcal{A}_1$ outputs.

Since $\mathcal{B}_0^{(i)}$ measures register $Z_{i+1}$ to obtain $z_{i+1}$ which includes $y_i = h_i(z_i)$, if the challenger for $\mathcal{B}^{(i)}$ measures the output of $h_i$, the measurement is redundant and has no effect on the state. Therefore, $\mathcal{B}^{(i)}$ perfectly simulates Hybrid i+1. On the other hand, if the challenger measures the input, this is exactly the same as measuring $Z_i$ to obtain $z_i$. Hence $\mathcal{B}^{(i)}$ perfectly simulates Hybrid i in this case. Therefore, $\mathcal{B}^{(i)}$ has advantage exactly $\epsilon_i = |p_i - p_{i+1}|$.

We then turn each $\mathcal{B}^{(i)}$ into a collision-finder for h, which we call $\mathcal{C}^{(i)}$, following Theorem 1. Conditioned on Lemma 2 holding, the functions $h_i$ are $\leq \ell$-to-1, meaning $\mathcal{C}^{(i)}$ finds a collision with probability at least $2\epsilon_i^2/(\ell-1)$. Notice that $\Sigma_i \epsilon_i \geq \epsilon$. Therefore, we can obtain an overall collision-finder $\mathcal{C}$, which runs $\mathcal{C}^{(i)}$ for a random choice of i. By Cauchy-Schwartz, the probability $\mathcal{C}$ obtains a collision is at least $$\frac{2}{u(\ell-1)} \sum_i \epsilon_i^2 \geq \frac{2\epsilon^2}{u^2(\ell-1)},$$

which is non-negligible. This contradicts the assumed collision resistance of h.

We now turn to proving Lemma 2.

Proof. We prove by induction on i. Clearly $N_0 = 2$ and $h_1$ is at most 2-to-1. We now fix h and $f_1, \ldots, f_{i-1}$, which determines $\mathcal{Y}_{i-1}$ and $N_{i-1}$. We inductively assume $N_{i-1} \leq \|h\|_2^{-2}$. We first prove, with overwhelming probability over the choice of $f_i$, that $h_i$ is $\leq \ell$-to-1 when restricted to $\mathcal{Y}_{i-1}$.

Toward that end, for any $y \in \mathcal{Y}$, let $p_y$ be the probability a random input to h maps to y. For any set of $\ell$ inputs $x_1, \ldots, x_\ell$, the probability they all map to the same output of h is:

$$Pr[h_i(x_1) = \ldots = h_i(x_\ell)] \leq \Pr_{\substack{w_j \leftarrow \chi \\ w_{j_1} \neq w_{j_2} \forall j_1 \neq j_2}}[h(w_1) = \ldots = h(w_\ell)] + \delta$$

$$\leq \Pr_{w_j \leftarrow \chi}[h(w_1) = \ldots = h(w_\ell)] + \delta$$

$$= \sum_{y \in \mathcal{Y}} p_y^\ell + \delta = \|h\|_\ell^\ell + \delta$$

Let V be the event that $h_i$ is not $<\ell$-to-1. Union-bounding over all sets of $\ell$ inputs in $\mathcal{Y}_{i-1}$, we have that $\ell$ $$Pr[V] \leq \binom{N_{i-1}}{\ell} \cdot (\|h\|_\ell^\ell + \delta)$$

$$\leq \frac{N_{i-1}^\ell \|h\|_\ell^\ell}{\ell!} + \delta \binom{N_{i-1}}{\ell}$$

$$\leq \frac{N_{i-1}^\ell \|h\|_\infty^{\ell-1}}{\ell!} + |\mathcal{Y}|^{-2} \quad \text{Equations (1) and (6)}$$

$$\leq \frac{(N_{i-1} \|h\|_\infty)^\ell \|h\|_\infty^{-1}}{\ell!} + |\mathcal{Y}|^{-2}$$

$$\leq \frac{(N_{i-1} r \|h\|_2^2)^\ell |\mathcal{Y}|}{\ell!} + |\mathcal{Y}|^{-2} \quad \text{Equation (4)}$$

$$\leq \frac{r^\ell |\mathcal{Y}|}{\ell!} + |\mathcal{Y}|^{-2} \quad \text{Inductive assumption}$$

$$\leq \left(\frac{re}{\ell}\right)^\ell |\mathcal{Y}| + |\mathcal{Y}|^{-2} \quad \text{Stirling's Approximation}$$

$$\leq 2^{-\ell} |\mathcal{Y}| + |\mathcal{Y}|^{-2} = 2 \times |\mathcal{Y}|^{-2} \quad \text{Equation (5)}$$

$|\mathcal{Y}|$ must be superpolynomial by the assumed collision resistance of h, and so the above quantity is negligible. Now it remains to prove the desired size bounds. First recall that $N_{t(j-1)+1} \leq 2 N_{t(j-1)}$ and $N_i \leq N_{i-1}$ for all i not of the form t(j−1)+1. The following suffices to prove the size bound in Lemma 2:

Claim. $N_{t(j−1)} \le \|h\|_2^{-2}/2$ for all j.

This claim implies that $N_{t(j−1)+1} \le \|h\|_2^{-2}$, and therefore all $N_{t(j−1)+k} \le \|h\|_2^{-2}$ for all k=2, . . . , t, thus proving Lemma 2. We now prove the claim by induction. Clearly for j=1 we have that $N_{t(j−1)} = N_0 = 1$, which is $\le \|h\|_2^{-2}/2$ since $\|h\|_2^2$, the collision probability of two random inputs to h, must be negligible. This establishes the base case.

We now inductively assume that $N_{t(j−1)+1} \le \|h\|_2^{-2}$. Our goal is to prove that $N_{t(j−1)+t} \le \|h\|_2^{-2}/2$. Note that if any i in the interval t(j−1)+2, . . . , tj satisfy $N_i \le \|h\|_2^{-2}/2$, then we are done since all subsequent i in the interval have $N_i \le N_{i-1}$. From now on, we will therefore assume towards contradiction that $N_i > \|h\|_2^{-2}/2$ for all i in the interval.

Let $C_i$ be the number of distinct pairs of colliding inputs to $h_i$. We observe the following:

Claim. If $h_i$ is $< \ell$-to-1, then $$M_i < N_{i-1} - \frac{2}{\ell} C_i.$$

The claim is proved as follows: by linearity, it suffices to consider the case where $h_i$ has a single output, meaning $M_i = 1$ and $N_i < \ell$. In this case, we have that $$N_{i-1} - \frac{2}{\ell} C_i = N_{i-1} - \frac{2}{\ell}\binom{N_{i-1}}{2} = N_{i-1} - \frac{N_{i-1}}{\ell}(N_{i-1} - 1)$$
$$> N_{i-1} - (N_{i-1} - 1) = 1 = M_i$$

Therefore, to bound $N_i = M_i$ for i=t(j−1)+2, . . . , tj, we need to bound $C_i$. To do so, let $P_2$ be the probability that two random distinct inputs to h map to the same image. Then $$P_2 = \sum_y p_y \left( \frac{p_y |\mathcal{X}| - 1}{|\mathcal{X}| - 1} \right) = \frac{|\mathcal{X}| \|h\|_2^2 - 1}{|\mathcal{X}| - 1} \ge \|h\|_2^2 - |\mathcal{X}|^{-1}.$$

For a set $L \subseteq \mathcal{Y}_{i-1}$, let $E_L$ be the indicator function for the event that all L map to the same value under $h_i$. Then $C_i = \Sigma_{L \subseteq i-1:|L|=2} E_L$. We now calculate the mean of $C_i$:

$$\mathbb{E}[C_i] = \sum_{L \subseteq \mathcal{Y}_{i-1}:|L|=2} \mathbb{E}[E_L] \ge \sum_{L \subseteq \mathcal{Y}_{i-1}:|L|=2} (P_2 - \delta) \ge \binom{N_{i-1}}{2} P_2 - 1$$
$$\ge \binom{N_{i-1}}{2} - (\|h\|_2^2 - |\mathcal{X}|^{-1}) - 1 = \frac{N_{i-1}^2 - N_{i-1}}{2}(\|h\|_2^2 - |\mathcal{X}|^{-1}) - 1$$
$$\ge \frac{N_{i-1}^2}{2}(\|h\|_2^2 - |\mathcal{X}|^{-1}) - 2$$

Recall that $\|h\|_2^2 \ge |\mathcal{Y}|^{-1} \ge 2|\mathcal{X}|^{-1}$ and that $N_{i-1}\|h\|_2^2 \in (\frac{1}{2}, 1]$ by assumption. Therefore, $\mathbb{E}|C_i| \ge N_{i-1}/8 - 2$.

From above we know that $Pr[V] \le 2|\mathcal{Y}|^{-2}$. Now we have, for i=t(j−1)+2, . . . , tj and assuming each such $N_{i-1} > \|h\|_2^{-2}$, $\mathbb{E}_{[N_i]} = \mathbb{E}_{[N_i|\neg V]}(1 - Pr[V]) + \mathbb{E}_{[N_i|V]}Pr[V] \le \mathbb{E}_{[N_{i-1} - (2/\ell)C_i|\neg V]}(1 - Pr[V]) + N_{i-1}Pr[V] \le N_{i-1} - (2/\ell)$
$\mathbb{E}_{[C_i|\neg V]}(1 - Pr[V]) + N_{i-1}Pr[V] \le N_{i-1} - (2/\ell)($
$\mathbb{E}_{[C_i]} - \mathbb{E}_{[C_i|V]}Pr[V]) + N_{i-1}Pr[V] \le N_{i-1} - (2/\ell)(N_{i-1}/8 - 2) + (2/\ell \mathbb{E}_{[C_i|V]} + N_{i-1})Pr[V] \le N_{i-1} - (2/\ell)(N_{i-1}/8 - 2) + N_{i-1}^2 Pr[V] \le N_{i-1} - (2/\ell)(N_{i-1}/8 - 2) + 2 \le N_{i-1} - N_{i-1}/5\ell$ Since $N_i$ is between 1 and $N_{i-1}$, we must have that $$Pr[N_i < N_{i-1}(1 - 1/10\ell)] \ge 1/10\ell.$$

Call an i "good" $N_i < N_{i-1}(1 - 1/10\ell)$. Let T be the number of good i. Suppose there are $\ge T$ good i in the interval t(j−1)+2, . . . , tj. Then $N_{tj} < (1 - 1/10\ell)^{10\ell} N_{t(j−1)+1} \le (e^{-1} - o(1))\|h\|_2^{-2} \le \|h\|_2^{-2}/2$. Since we assumed this was not the case, it must be that $T < 10\ell$. But $\mathbb{E}[T] \ge t/10\ell = 20\ell$, so by Hoeffding's inequality, $$Pr[T < 10\ell] \le Pr[T - \mathbb{E}[T] < -10\ell]$$
$$< e^{-2(10\ell)^2/t} = e^{-\ell}.$$

Thus, except with negligible probability, $N_{tj}$ must in fact be $\le \|h\|_2^{-2}/2$. This completes the proof of Lemma 2 and hence Theorem 2.

5 Collapsing Hashes from LPN

In this section, we construct collapsing hash functions from the hardness of learning parities with noise (LPN) in certain extreme parameter regimes.

5.1 LPN-Based Hashing

For positive integers n, m>n and error rate $\epsilon \in [0, 0.5]$, define $LPN_\epsilon^{n \times m}$ to be the following distribution: choose a random $s \leftarrow \mathbb{Z}_2^n$ and random $A \leftarrow \mathbb{Z}_2^{n \times m}$. Choose a random $e \in B_\epsilon^m$, $B_\epsilon$ is the Bernoulli distribution: output 1 with probability $\epsilon$ and 0 otherwise. The output of $LPN_\epsilon^{n \times m}$ is then $(A, s^T \cdot A + e^T \mod 2)$. The LPN assumption states that it is computationally infeasible to distinguish $LPN_\epsilon^{n \times m}$ from the uniform distribution $\mathbb{Z}_2^{(n+1) \times m}$. Specifically:

Assumption 1. For parameters $\epsilon = \epsilon(n)$, m=m(n), T=T(n), The ($\epsilon$, m, T)-LPN assumption is that, for any adversary $\mathcal{A}$ running in time at most T, there exists a negligible negl(n) such that $|Pr[1 \leftarrow \mathcal{A} (LPNE_\epsilon^{n \times m})] - Pr[1 \leftarrow \mathcal{A} (\mathbb{Z}_2^{(n+1) \times m})]|$
$< negl(n).$ Brakerski et al. and Yu et al. show how to construct a hash function from the LPN problem as follows:

Construction 2. Let $S_w^m \subseteq \{0,1\}^m$ be the set of length-m vectors, where the domain is divided into w blocks of size m/w, and each block contains exactly a single 1. Let LPN-Hash$_w^{n \times m}$ be the hash function family defined as follows: $h: S_w^m \to \{0, 1\}^n$ is specified by a random matrix $A \in \mathbb{Z}_2^{n \times m}$. Then $h(x) = A \cdot x \mod 2$.

Remark 7. Brakerski et al. allow for a slightly more general domain where the inputs can have w 1's in any position. For our analysis of semi-regularity, however, it will be convenient to use the domain $S_w^m$ as defined.

Theorem 3. Under the $(O(\log^2 n/n), \text{poly}, \text{poly})$-LPN assumption, LPNHash$_w^{n \times m}$ is a PQ-CRHF for m=poly(n) and w=O(n/log n).

Theorem 4. The following are true:

Under the $(O(1), 2^{O(n^{0.5})}, 2^{O(n^{0.5+\epsilon})})$-LPN assumption, LPN-Hash$_w^{n \times m}$ is a PQ-CRHF for n=O($\log^2 \lambda$), m=$\lambda$, and w=O($\log^{1+2\epsilon} \lambda$).

Under the $(O(1), 2^{O(n/\log n)}, \text{poly})$-LPN assumption, LPN-Hash$_w^{n \times m}$ is a PQ-CRHF for m=poly(n) and w=O(n/log n).

Under the $(O(n^{-0.5}), 2^{O(n^{0.5}/\log n)}, \text{poly})$-LPN assumption, LPNHash$_w^{n \times m}$ is a PQ-CRHF for m=poly(n) and w=O (n/log n).

5.2 Semi-Regularity of LPN-Based Hashing

We now prove that LPNHash is semi-regular, for appropriate parameter choices.

Theorem 5. For any m, n, w, let $\alpha := \sqrt{n(w/m)\ln 2}$. If $\alpha \le \frac{1}{2}$ and $\alpha^w \le 2^{-n}$, then LPNHash$_w^{n \times m}$ is semi-regular.

Before proving Theorem 5, we observe an immediate corollary:

Corollary 2. If LPN is hard in any of the parameter regimes in Theorems 3 or 4, then collapsing hash functions exist:

Proof. By Theorem 2, it suffices to show that the settings of parameters in Theorems 3 and 4 satisfy the conditions of Theorem 5. For the settings where m=poly(n) and w=O(n/log n), we just need to set $m=n^c$ and $w=dn \log n$ where $cd \geq 2$. Then $\alpha=o(1)$ and $$\alpha^w = \left(\frac{dn^2 \ln 2}{n^{1+c} \log n}\right)^{dn/2 \log n} \leq \left(\frac{1}{n^{c-1}}\right)^{dn/2 \log n} \leq 2^{-n}.$$

For the setting where $n=O(\log^2 \lambda)$, $m=\lambda=2^{n^{0.5}}$, $w=O(\log^{1+2\epsilon} \lambda))=O(n^{0.5+\epsilon})$, we have $\alpha=\text{poly}(n)2^{-O(n^{0.5})} \leq 2^{-O(n^{0.5-\epsilon/2})}=o(1)$ and $\alpha^w \leq 2^{-O(n^{1+\epsilon/2})} < 2^{-n}$.

We now prove Theorem 5.

Proof. Our goal is to show that $\|h(S_w^m)\|_\infty = \text{poly}/2^n$, which implies $H_\infty(h) \geq n - O(\log n)$. Since $H_2(h) \leq n$, this would establish semi-regularity.

We will write $A=(v_1, \ldots, v_m)$ for vectors $v_i \in \mathbb{Z}_2^n$. Let $D_i$ be the distribution $v_{j_1} + v_{m/w+j_2} + \cdots + v_{(m/w)(i-1)+j_i}$, where each $j_i$ is uniform in $[m/w]$. Then $h(S_w^m) = D_w$.

Lemma 3. Fix $v_1, \ldots, v_{(m/w)i}$. Suppose $\|D_i\|_\infty = f/2^n$. Then except with probability $2^{-n}$ over the choice of $v_{(m/w)i+1}, \ldots, v_{(m/w)(i+1)}$, $\|D_{i+1}\|_\infty \leq (1+g)/2^n$, where $g = f\sqrt{n(w/n)\ln 2}$ Proof. For each x in $\{0, 1\}^n$, define $p_x^{(i)} := \Pr[x \leftarrow D_i]$. Then $$p_x^{(i+1)} = \frac{w}{m} \sum_{j=1}^{w/m} p_{x \oplus v_{(m/w)i+j}}^{(i)}.$$

The $v_{(m/w)i+j}$ are just independent random vectors, so we can think of $p_x^{(i+1)}$ as a random variable which is the mean of w/m random samples of $p_{x'}^{(i)}$ for random x'. Each of the $p_{x'}^{(i)}$ are non-negative random variables with mean $2^{-n}$ (since they must sum to 1) and maximum $f \times 2^{-n}$. By Hoeffding's inequality, $$\Pr\left[p_x^{(i+1)} > (1+g)/2^n\right] = \Pr\left[p_x^{(i+1)} - 2^{-n} > g/2^n\right] < e^{-2(m/w)\frac{g^2}{f^2}}.$$

Union-bounding over all $2^n$ different x, we have that $$\Pr\left[\|D_{i+1}\|_\infty > (1+g)/2^n\right] < 2^n \times e^{-2(m/w)\frac{g^2}{f^2}}.$$

By setting $g = f\sqrt{n(w/n)\ln 2}$, the right-hand side becomes 2 as desired.

Notice that $\|D_0\|_\infty = 1$. Let $\alpha = \sqrt{n(w/n)\ln 2}$. Union-bounding over all $i=1, \ldots, w$, we therefore have that $$\|D_{i+1}\|_\infty \leq \alpha \|D_i\|_\infty + 2^{-n}.$$

for all i. Then $$\|D_w\|_\infty \leq \alpha^w \|D_0\|_\infty + \left(\sum_{i=0}^{w-1} \alpha^i\right) \times 2^{-n} \leq \alpha^w + \frac{1}{1-\alpha} \times 2^{-n}.$$

If we set $\alpha$ so that $\alpha^w \leq 2^{-n}$ and $\alpha \leq \frac{1}{2}$, we have that $\|D_w\|_\infty \leq 3 \times 2^{-n}$, showing that LPNHash is semi-regular. Q

6 Collapsing Hashes from Expanders

Charles, Goren, and Lauter, abstracting earlier ideas of Tillich and Zémor, propose an elegant way to construct collision resistant hash functions from exponentially-large expander graphs, whose collision-resistance follows from the assumed difficulty of finding cycles in the graphs. A number of graphs have been proposed for use in hash functions, such as:

Charles et al. propose using isogeny graph on certain elliptic curves.

Fuchs et al. propose using the graph of Markov Triples.

We show that expander-based hashes satisfy our regularity condition, and hence we can obtain collapsing hash functions under the same computational assumptions on expanders as for collision resistance.

6.1 Expander Graphs

Let $G=(V, E)$ be an undirected graph. G is d-regular if every $v \in V$ has exactly d neighbors. Throughout, we will always assume our graphs are regular. Let $A=A(G)$ denote the adjacency matrix of G: the $|V| \times |V|$ matrix such that $A_{i,j}$ if $(i, j) \in E$ and 0 otherwise. Since A is symmetric, it has $|V|$ real eigenvalues $\lambda_1 \geq \lambda_2 \geq \ldots \geq \lambda_n$. For a d-regular graph, $\lambda_1 = d$.

There are several equivalent definitions of expander graphs; the following linear-algebraic definition captures the only property we will need.

Definition 5. A connected d-regular graph G is a ($|V|$, d, $\delta$)-expander graph if $\lambda_2 \leq \delta d$.

Walks on Expanders. Let G be a d-regular graph, and let $v_0 \in V$ be a node. A walk on G starting from $v_0$ is simply a sequence $(v_0, v_1, v_2, \ldots)$ such that $(v_{i-1}, v_i) \in E$ for all $i > 0$. A random walk is one where $v_{i+1}$ is chosen uniformly from the set of neighbors of $v_i$. A non-backtracking walk is one where $v_{i-1} \neq v_{i+1}$ for all $i > 0$, and a random non-backtracking walk is a walk where $v_{i+1}$ is chosen uniformly from the neighbors of $v_i$ other than $v_{i-1}$.

For a d regular graph, the nodes $v_i$ for a random walk and random non-backtracking walk will converge to the uniform distribution over V as $i \to \infty$. We will use the notion of mixing time to characterize how fast this occurs.

Definition 6. The mixing time of a random walk starting at $v_0$ is defined as $$\tau(G) = \min_t \left\{ \left| \Pr[v_t = u] - \frac{1}{|V|} \right| \leq \frac{1}{2|V|} \, \forall u \in V \right\},$$

where $\Pr[v_t=u]$ is the probability that $v_t=u$ in the walk. The mixing time for a random non-backtracking walk is defined as $\tilde{\tau}(G)$, and is defined analogously.

For both backtracking and non-backtracking walks, the mixing time is at most $O(\log(|V|)/(1-\delta))$. The backtracking case has long been known, and the non-backtracking case follows from the fact that non-backtracking walks mix at least as fast.

6.2 Hash Functions Based on Expanders

Let $\mathcal{G} = (\mathcal{G}_\lambda)_\lambda$ where each $\mathcal{G}_\lambda$ is a family of d-regular connected graphs where each $G=(V, E) \in \mathcal{G}_\lambda$ is exponentially large and implicitly represented. That is, $V \subseteq \{0, 1\}^{n(\lambda)}$, and each G is represented by a polynomial-size string Desc(G). There is an efficient procedure which computes the neighbors of any $v \in V$, given Desc(G). We assume that Desc(G) includes a distinguished node $v_0$, and that it is possible to efficiently sample Desc(G) for a random $G \leftarrow \mathcal{G}_\lambda$.

Definition 7. The Cycle Finding problem is hard in $\mathcal{G}$ if, for any QPT $\mathcal{A}$, $\mathcal{A}$ (Desc(G)), G←$\mathcal{G}_\lambda$ outputs a simple cycle in G with negligible probability.

Based on cycle finding hardness, prior work constructs the following hash:

Construction 3. Let ExHash$_\mathcal{G}$ be the distribution over functions $h_{Desc(G)}:[d-1]^l \to \{0, 1\}^{n(\lambda)}$ for a random G←$\mathcal{G}_\lambda$ defined as follows: interpret each element x of $[d-1]^n$ as a length-n non-backtracking walk in G starting from $v_0$. That is, on the ith step, if the walk is currently at node $v_i$ and was previously at $v_{i-1}$, then $x_i$ selects amongst the d−1 neighbors of $v_i$ other than $v_{i-1}$. That neighbor will be $v_{i+1}$. Let $v_t$ be the end of the walk. Then $h_{Desc(G)}(x)=v_t$.

Theorem 6. ExHash$_\mathcal{G}$ is a PQ-CRHF if cycle finding is hard in $\mathcal{G}$.

Proof. We give the proof for completeness. Any collision in $h_{Desc(G)}$ gives two non-backtracking walks $W_0 \neq W_1$ that start at $v_0$ and end at the same node v. Assume without loss of generality that the nodes immediately before v in $W_1$, $W_1$ are different. Let $v_1$ be the last node before v where the walks coincide. Then by concatenating the two paths from $v_1$ to v under $W_0$, $W_1$ gives a simple cycle.

Prior work proposes using expander graphs as a minimal criteria for selecting $\mathcal{G}$ where the cycle finding problem is hard. A uniformly random input to ExHash$_\mathcal{G}$ corresponds to a random non-backtracking walk on $\mathcal{G}$. Since the mixing time of an expander is logarithmic in |V|, it is polynomial for implicitly represented graphs. Once the walk mixes, no node in the graph is more likely than 2/|V|, implying $\|h\|_\infty \leq 2/|V|$. Meanwhile, $\|h\|_2^2 \geq 1/|V|$. Therefore, for a polynomial-length input, ExHash$_\mathcal{G}$ is semi-regular with r≤2. Therefore, we have the following:

Corollary 3. Suppose $\mathcal{G}$ is a family of ($|V_\lambda|$, d, δ)-expander graph for a constant δ. Then if cycle finding is hard for $\mathcal{G}$, there exists collapsing hash functions.

When V is an appropriate set of elliptic curves and E are isogenies as proposed by prior work, cycle-finding is a well-known challenging problem. The graph of Markov triples has been explored by prior work. Other instantiations have been proposed, but they have weaknesses.

7 Toward Collapsing Hashes from General Collision Resistance

Here, we discuss the possibility of obtaining collapsing hashes from more general PQ-CRHFs. In particular, we are interested in the case of symmetric hash functions such as SHA2 or SHA3. It seems plausible that SHA2 or SHA3 would be semi-regular: after all, if a hash function had certain images that were far more likely than others, this would be considered a significant design weakness. Unfortunately, we do not know how to prove unconditionally that, say, SHA2 or SHA3 are semi-regular. Instead, we simply conjecture it. The following shows that this assumption is justified in the random oracle mode:

Lemma 4. Random oracles are semi-regular. In particular, for λ bit outputs, a compressing random oracle has regularity at most λ.

Proof. By a standard balls-and-bins argument, for a random function $F:\{0, 1\}^m \to \{0, 1\}^\lambda$, the most likely output has probability $H_\infty(F) \leq O(\lambda 2^{-\lambda})$, with all but negligible probability. On the other hand, $\|F\|_2^2 > 2^{-\lambda}$. Thus F has regularity at most O(λ).

Since SHA2 or SHA3 are often modeled as random oracles, it therefore seems reasonable to conjecture that they are semi-regular. Note that this is potentially very different than assuming SHA2 or SHA3 are collapsing, even though random oracles are collapsing. Indeed, the analysis of SHA2 and SHA3 has usually focused on classical security properties. Semi-regularity is a simple classical property, whereas collapsing is a more complicated inherently quantum property. Under the assumed quantum collision resistance and assumed regularity of either SHA2 or SHA3, we therefore obtain a standard-model collapsing hash function from classically-defined properties, which are much better understood.

System Implementations

The embodiments described herein can be implemented by systems, methods, and computer-readable media configured for creating a quantum-secure hash of an m-bit input by:

receiving an m-bit input message;
executing a setup routine, the setup routine comprising:
storing executable instructions for a first hash function
(h) that is configured to generate an output having length of n and an input length l, where l is at least n+1;
establishing a desired input length m for a second hash function;
computing a bit-length value a based on i, m and n and a semi-regularity property of the first hash function;
creating a of k-wise delta-dependent injections $f_1, \ldots, f_u$, the injections having a domain of n+1 bits and a range of l bits;
evaluating the second hash function by:
transforming the m-bit input to a u-bit length input z by padding;
setting $y_0$ as a string of n zeros;
computing $y_u$ by iterating i from 1 to a and:
combining $y_{(i-1)}$ with $i^{th}$ bit of z;
applying $f_i$ to the combination;
generating $y_i$ by executing the first hash function (h) on the output of $f_i$; and
outputting and storing $y_u$ as an output of the second hash function.

In further embodiments, the semi-regularity property is based on a distribution of the first hash function (h) on random inputs.

In further embodiments, the padding to generate the u-bit length input z is performed by inserting a predetermined number of zeros (t) between every bit of the input, wherein the number of zeros is based on l, m, and n and the semi-regularity property of the first hash function.

Figure 2:
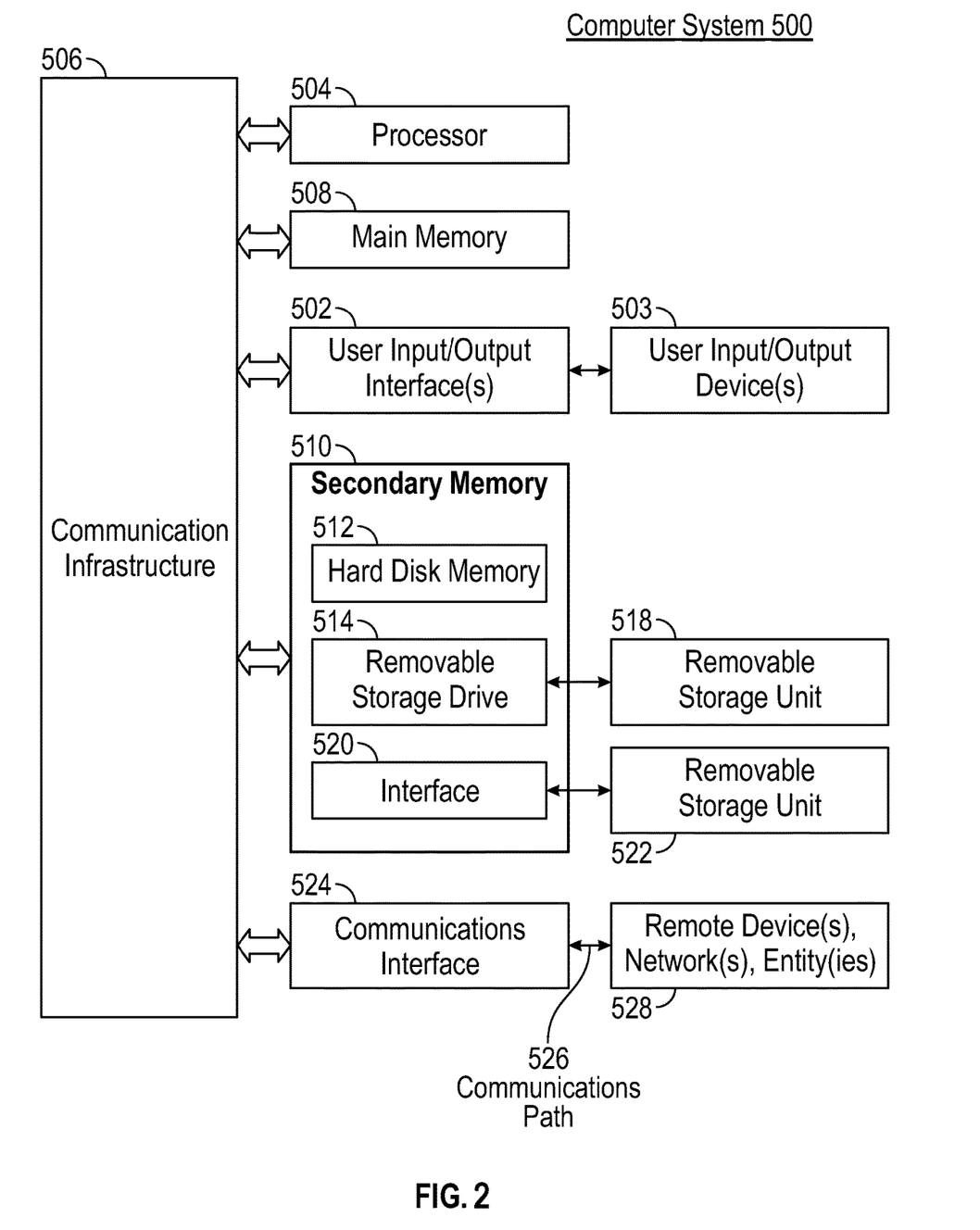
FIG. 2 illustrates an example computer system architecture for implementing the claimed systems and methods.
Figure 3:
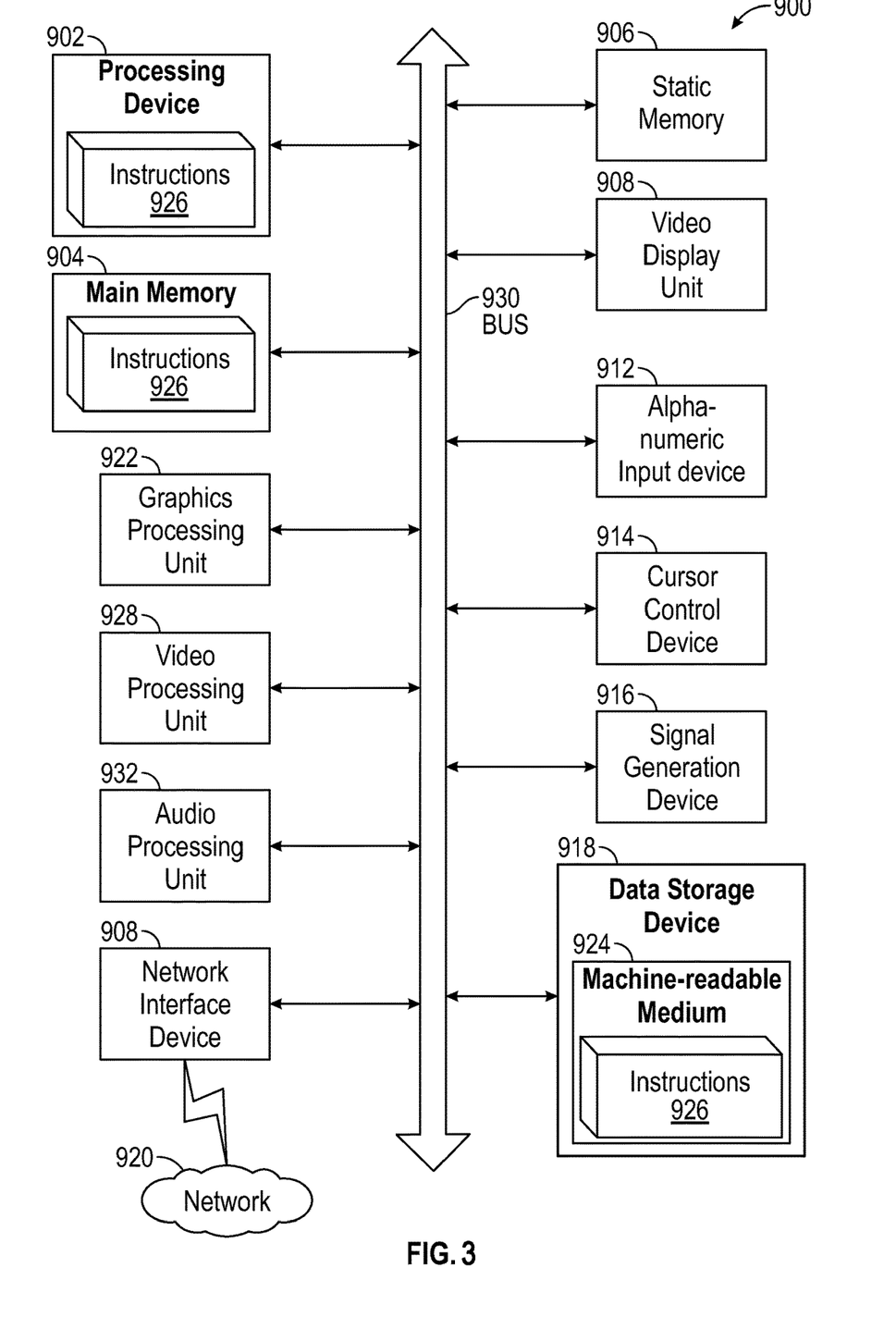
FIG. 3 illustrates further details of an example computer system architecture for implementing the claimed systems and methods.

FIGS. 2 and 3 depict example computer systems useful for implementing various embodiments described in the present disclosure. Various embodiments may be implemented, for example, using one or more computer systems, such as computer system 500 shown in FIG. 2. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 3 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 2 and 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for creating a quantum-secure hash of an m-bit input by:
   receiving an m-bit input message at a computer processor via a network interface, wherein m is a positive integer;
   executing a setup routine using the computerized processor, the setup routine comprising:
      storing executable instructions in computer memory for a first hash function (h) that is configured to generate an output having length of n bits and an input length l bits, where h is a hash function, n is a positive integer, l is a positive integer, and l is at least n+1;
      establishing a desired input length m for a second hash function;
      computing using a computerized algorithm a bit-length value u based on l, m and n and a semi-regularity property of the first hash function, wherein u is a positive integer;
      creating using the computer processor u of k-wise delta-dependent injections $f_1, \ldots, f_u$, wherein k is a positive integer and each $f_i$ is an injection having a domain of n+1 bits and a range of l bits;
   evaluating the second hash function using the computerized processor by:
      transforming the m-bit input to a u-bit length input z by padding, wherein z is a bit string;
      setting $y_0$ as a string of n zeros, wherein $y_0$ is a bit string;
      computing $y_u$ by iterating i from 1 to u, wherein i is a positive integer, and:
         combining $y_{(i-1)}$ with $i^{th}$ bit of z, wherein $y_{i-1}$ is a bit string;
         applying $f_i$ to the combination;
         generating $y_i$ by executing the first hash function (h) on the output of $f_i$, wherein $y_i$ is a bit string; and
      outputting and storing $y_u$ in computer memory as an output of the second hash function, wherein $y_u$ is a bit string.

2. The method of claim 1, wherein the semi-regularity property is based on a distribution of the first hash function (h) on random inputs.

3. The method of claim 2, wherein the padding to generate the u-bit length input z is performed by inserting a predetermined number of zeros (t) between every bit of the input, wherein t is a positive integer and the number of zeros is based on l, m, and n and the semi-regularity property of the first hash function.

4. The method of claim 1, wherein computing the bit-length value u comprises computing u using the computer processor as (m−1)×t+1.

5. The method of claim 1, wherein selecting the number of zeros t used in the padding is based on a semi-regularity property of the first hash function (h).

6. The method of claim 1, further comprising storing, in the computer memory, parameters defining the injections $f_1, \ldots, f_u$ prior to evaluating the second hash function.

7. The method of claim 1, further comprising transmitting the final output $y_u$ from the computer processor to a remote device via the network interface.

8. A system for creating a quantum-secure hash of an m-bit input, comprising a computerized processor and computer memory configured for:
   receiving an m-bit input message at the computerized processor via a network interface, wherein m is a positive integer;
   executing a setup routine using the computerized processor, the setup routine comprising:
      storing executable instructions in the computer memory for a first hash function (h) that is configured to generate an output having length of n bits and an input length l bits, where h is a hash function, n is a positive integer, l is a positive integer, and l is at least n+1;
      establishing a desired input length m for a second hash function;
      computing using a computerized algorithm a bit-length value u based on l, m and n and a semi-regularity property of the first hash function, wherein u is a positive integer;
      creating using the computerized processor u of k-wise delta-dependent injections $f_1, \ldots, f_u$, wherein k is a positive integer and each $f_i$ is an injection having a domain of n+1 bits and a range of l bits;
   evaluating the second hash function by:
      transforming the m-bit input to a u-bit length input z by padding, wherein z is a bit string;
      setting $y_0$ as a string of n zeros, wherein $y_0$ is a bit string;
      computing $y_u$ by iterating i from 1 to u, wherein i is a positive integer, and:
         combining $y_{(i-1)}$ with $i^{th}$ bit of z, wherein $y_{i-1}$ is a bit string;
         applying $f_i$ to the combination;
         generating $y_i$ by executing the first hash function (h) on the output of $f_i$, wherein $y_i$ is a bit string; and
      outputting and storing $y_u$ in the computer memory as an output of the second hash function, wherein $y_u$ is a bit string.

9. The system of claim 8, wherein the semi-regularity property is based on a distribution of the first hash function (h) on random inputs.

10. The system of claim 9, wherein the padding to generate the u-bit length input z is performed by inserting a predetermined number of zeros (t) between every bit of the input, wherein t is a positive integer and the number of zeros is based on l, m, and n and the semi-regularity property of the first hash function.

11. The system of claim 8, further comprising a communications interface configured to receive the m-bit input message over at least one of a wired or wireless network.

12. The system of claim 8, further comprising a graphics processing unit configured to perform at least a portion of the evaluating of the second hash function.

13. The system of claim 8, further comprising a non-volatile secondary storage device configured to store the executable instructions for the first hash function (h) and to persistently store the final output $y_u$.

14. The system of claim 8, wherein the first hash function (h) is instantiated using a walk on an implicitly represented expander graph.

15. A computer-readable media containing instructions that upon execution cause a computerized processor with computer memory to create a quantum-secure hash of an m-bit input by:
    receiving an m-bit input message at the computerized processor via a network interface, wherein m is a positive integer;
    executing a setup routine, the setup routine comprising:
        storing executable instructions for a first hash function (h) that is configured to generate an output having length of n bits and an input length l bits, where h is a hash function, n is a positive integer, l is a positive integer, and l is at least n+1;
        establishing a desired input length m for a second hash function;
        computing a bit-length value u based on l, m and n and a semi-regularity property of the first hash function, wherein u is a positive integer;
        creating u of k-wise delta-dependent injections $f_1, \ldots, f_u$, wherein k is a positive integer and each $f_i$ is an injection having a domain of n+1 bits and a range of l bits;
    evaluating the second hash function by:
        transforming the m-bit input to a u-bit length input z by padding, wherein z is a bit string;
        setting $y_0$ as a string of n zeros, wherein $y_0$ is a bit string;
        computing $y_u$ by iterating i from 1 to u, wherein i is a positive integer, and:
            combining $y_{(i-1)}$ with $i^{th}$ bit of z, wherein $y_{i-1}$ is a bit string;
            applying $f_i$ to the combination;
            generating $y_i$ by executing the first hash function (h) on the output of $f_i$, wherein $y_i$ is a bit string; and
        outputting and storing $y_u$ as an output of the second hash function, wherein $y_u$ is a bit string.

16. The computer readable media of claim 15, wherein the semi-regularity property is based on a distribution of the first hash function (h) on random inputs.

17. The computer readable media of claim 16, wherein the padding to generate the u-bit length input z is performed by inserting a predetermined number of zeros (t) between every bit of the input, wherein t is a positive integer and the number of zeros is based on l, m, and n and the semi-regularity property of the first hash function.

18. The computer-readable media of claim 15, wherein the instructions further cause the computerized processor to display the final output $y_u$ on a video display device.

19. The computer-readable media of claim 15, wherein the instructions further cause the computerized processor to transmit the final output $y_u$ to a remote device via the network interface.

20. The computer-readable media of claim 15, wherein the instructions further cause instantiation of the first hash function (h) using a Learning Parity with Noise based hashing construction.

* * * * *